US012270516B2

(12) United States Patent
Wang et al.

(10) Patent No.: US 12,270,516 B2
(45) Date of Patent: Apr. 8, 2025

(54) CHRISTMAS LED BULB MANUFACTURING PROCESS

(71) Applicant: Polyrocks Technology (Hunan) Co., Ltd., Chenzhou (CN)

(72) Inventors: Xiangyong Wang, Heshan (CN); Hong Yang, Heshan (CN)

(73) Assignee: Polyrocks Technology (Hunan) Co., Ltd., Chenzhou (CN)

( * ) Notice: Subject to any disclaimer, the term of this patent is extended or adjusted under 35 U.S.C. 154(b) by 305 days.

(21) Appl. No.: 18/172,015

(22) Filed: Feb. 21, 2023

(65) Prior Publication Data

US 2024/0183502 A1 Jun. 6, 2024

(30) Foreign Application Priority Data

Dec. 6, 2022 (CN) ......................... 202211578352.6

(51) Int. Cl.
*F21K 9/90* (2016.01)

(52) U.S. Cl.
CPC ...................................... *F21K 9/90* (2013.01)

(58) Field of Classification Search
CPC . F21K 9/272; F21K 9/275; F21K 9/90; F21K 9/66; F21K 9/232; F21V 23/002; F21V 17/06; F21V 19/0025; F21V 23/001; F21V 31/005; F21V 3/061; F21V 29/506; H01J 5/32; G02F 1/133604; F21S 4/26; F21S 2/00; F21S 4/10; F21Y 2115/10; B22F 10/20
See application file for complete search history.

(56) References Cited

U.S. PATENT DOCUMENTS 11,002,423 B1 † 5/2021 Yang

FOREIGN PATENT DOCUMENTS

| | | | | |
|---|---|---|---|---|
| CN | 202834811 U | | 3/2013 | |
| CN | 104864285 A | | 8/2015 | |
| CN | 106764530 A | | 5/2017 | |
| CN | 108799871 A | * | 11/2018 | ............. F21K 9/232 |
| EP | 3290773 B1 | * | 5/2019 | ............... F21K 9/23 |
| JP | 2008098542 A | | 4/2008 | |
| WO | WO-2020187816 A1 | * | 9/2020 | ............. F21K 9/232 |

OTHER PUBLICATIONS

Search English translation of CN-108799871-A (Year: 2018).*
(Continued)

*Primary Examiner* — Omar Rojas Cadima
(74) *Attorney, Agent, or Firm* — M&B IP Analysts, LLC

(57) ABSTRACT

A Christmas LED bulb manufacturing process includes: taking a conductive wire: taking a conductive wire with a preset length, the conductive wire being a Dumet wire or a platinum wire; removing impurities: removing foreign matters and impurities on a surface of the conductive wire; welding a chip: welding and fixing a LED chip to the conductive wire after impurity removal; sealing: after the chip is welded, injecting one of silica gel, resin and silica gel, or a mixture of resin and a high thermal conductivity material into the LED chip to wrap the LED chip; assembling: inserting the sealed LED chip into a glass tube; and performing glass-sealing: melting two ends of the glass tube for sealing and molding.

7 Claims, 4 Drawing Sheets

(56) References Cited

OTHER PUBLICATIONS

Application AU 2023201073 as accepted, dated Jun. 13, 2024. Australian Patent Office, Australia.
Examination Report No. 1 for Standard Patent Application: 2023201073, dated Nov. 24, 2023. Searching Authority Australian Government, Australia.
Notice of Acceptance for Patent Application: 2023201073, dated May 31, 2024. Searching Authority Australian Government, Australia.

* cited by examiner
† cited by third party

CHRISTMAS LED BULB MANUFACTURING PROCESS

CROSS-REFERENCE TO RELATED APPLICATION

This application is filed on the basis of Chinese patent application No. 2022115783526 filed Dec. 6, 2022, and claims priority of the Chinese patent application, the entire contents of which are incorporated herein by reference.

TECHNICAL FIELD

The disclosure relates to the technical field of Christmas lamps, and more particularly, to a Christmas LED bulb manufacturing process.

BACKGROUND

In the related art, a tungsten wire is sealed and fixed within a Christmas bulb which emits light through the tungsten wire, but energy consumption of the tungsten wire is high. Moreover, in the manufacturing process, the wick pin of the tungsten wire is generally fused and fixed with a plastic lamp shell, but the effect of the tungsten wire emitting light through the plastic lamp shell is not good. In some related arts, the lamp shell is spliced with a LED wick, but the LED wick and the lamp shell can only be set separately, and the integration of the LED wick and the lamp shell is a difficult problem to be solved urgently.

SUMMARY

The disclosure aims at solving at least one of the technical problems in the existing technology. Therefore, the disclosure provides a Christmas LED bulb manufacturing process, which comprises the following steps of: removing impurities from a conductive wire, welding and fixing a LED chip, inserting the conductive wire into a glass tube, and performing glass-sealing with the glass tube, so as to realize the integrated arrangement of the LED chip and the glass tube, effectively prevent dust and water from entering the LED chip, and ensure better sealing performance of the bulb.

The Christmas LED bulb manufacturing process according to embodiments of the disclosure comprises:

- taking a conductive wire: taking a conductive wire with a preset length, the conductive wire being a Dumet wire or a platinum wire;
- removing impurities: removing foreign matters and impurities on a surface of the conductive wire;
- welding a chip: welding and fixing a LED chip to the conductive wire after impurity removal;
- sealing: after the chip is welded, injecting one of silica gel, resin and silica gel, or a mixture of resin and a high thermal conductivity material into the LED chip to wrap the LED chip;
- assembling: inserting the sealed LED chip into a glass tube; and
- performing glass-sealing: melting two ends of the glass tube for sealing and molding.

The Christmas LED bulb manufacturing process according to the embodiments of the disclosure at least has the following beneficial effects. The conductive wire after impurity removal is welded and fixed with the LED chip, then the conductive wire is inserted into the glass tube, and glass-sealed with the glass tube, so as to realize the integrated arrangement of the LED chip and the glass tube, effectively prevent dust and water from entering the LED chip, and ensure better sealing performance of the bulb. Compared with a Christmas tungsten lamp, the finally manufactured Christmas LED bulb is more energy-saving and environmental-friendly, and the irradiation effect of light through the glass tube is better.

According to the Christmas LED bulb manufacturing process of the disclosure, during the impurity removal, the conductive wire is cleaned by laser.

According to the Christmas LED bulb manufacturing process of the disclosure, during the impurity removal, the conductive wire is immersed in a conductive wire cleaning solution.

The Christmas LED bulb manufacturing process according to the disclosure further comprises: melting a bracket: after taking two conductive wires, welding a bracket made of an insulating material between the two conductive wires.

According to the Christmas LED bulb manufacturing process of the disclosure, the bracket is made of glass, and the bracket is welded with the two conductive wires by means of sintering.

According to the Christmas LED bulb manufacturing process of the disclosure, the bracket and the LED chip are inserted into the glass tube together during assembling.

According to the Christmas LED bulb manufacturing process of the disclosure, the bracket is located at one end of the LED chip facing a spliced position between the LED chip and the glass tube.

According to the Christmas LED bulb manufacturing process of the disclosure, the bracket is of a spherical shape and abuts against an inner wall of the glass tube.

According to the Christmas LED bulb manufacturing process of the disclosure, the glass tube is of a columnar shape, and during the glass-sealing, one end of the LED chip spliced with the glass tube is first fused for sealing and molding, and then the other end of the LED chip spliced with the glass tube is fused for sealing and molding.

The Christmas LED bulb manufacturing process according to the disclosure further comprises: performing secondary machining: straightening and cutting a pin of the sealed conductive wire to regulate the pin of the conductive wire.

Additional aspects and advantages of the disclosure will be given in part in the following description, and will become apparent in part from the following description, or will be learned through the practice of the disclosure.

BRIEF DESCRIPTION OF THE DRAWINGS

The above and/or additional aspects and advantages of the disclosure will be more apparent from the following description of the embodiments in conjunction with the accompanying drawings, wherein.

DESCRIPTION OF REFERENCE NUMERALS

Figure 1:
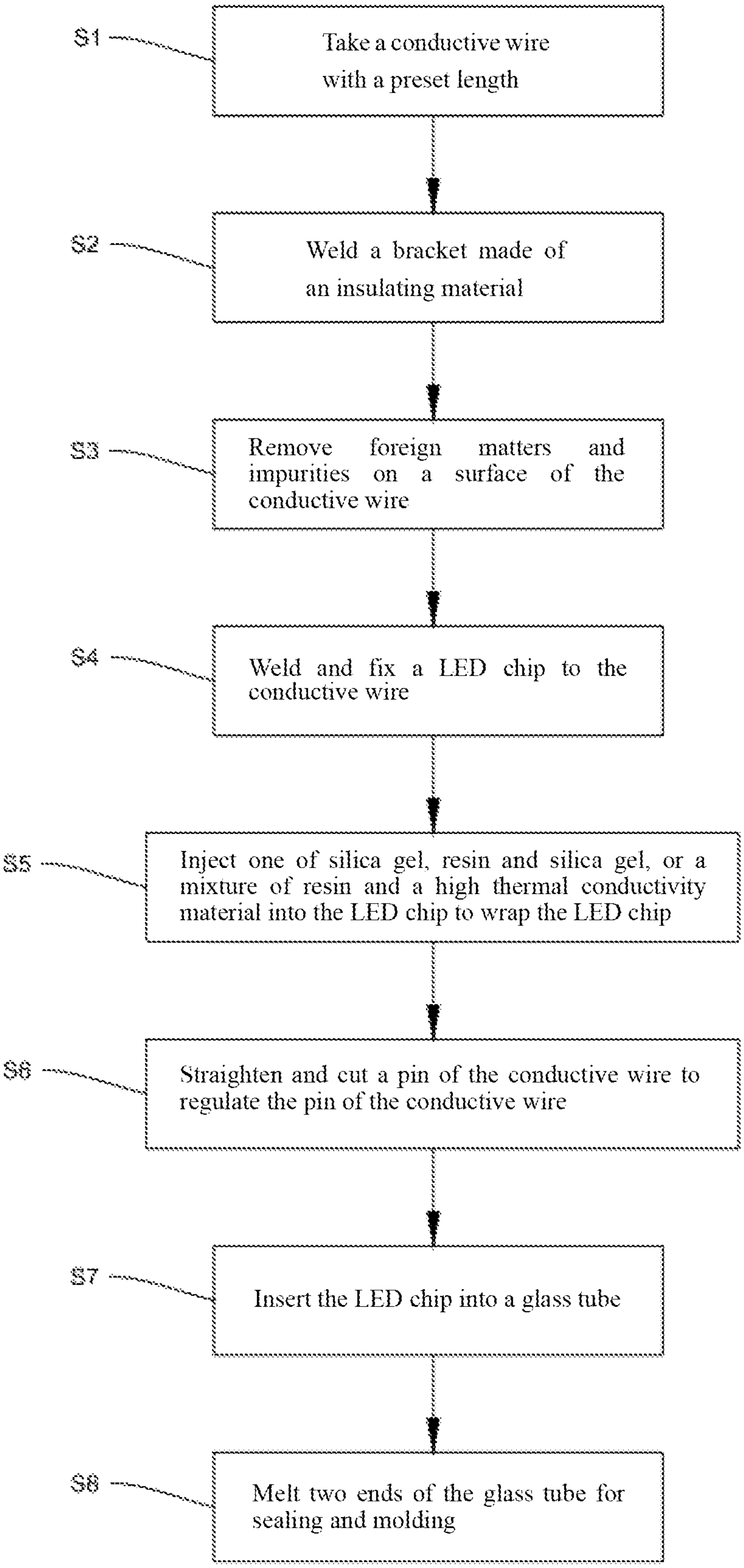
FIG. 1 is a flow chart of a Christmas LED bulb manufacturing process according to embodiments of the disclosure.

S1: taking a conductive wire; S2: melting a bracket; S3: removing impurities: S4: welding a chip; S5: sealing; S6: performing secondary machining; S7: assembling; and S8: performing glass-sealing;

100 refers to glass tube; 110 refers to conductive wire; 111 refers to LED chip; 112 refers to bracket; and 113 refers to protection glue.

DETAILED DESCRIPTION

The embodiments of the disclosure will be described in detail hereinafter. Examples of the embodiments are shown in the accompanying drawings. The same or similar reference numerals throughout the drawings denote the same or similar elements or elements having the same or similar functions. The embodiments described below with reference to the accompanying drawings are exemplary and are only intended to explain the disclosure, but should not be construed as limiting the disclosure.

In the description of the disclosure, it shall be understood that the orientation or position relation related to the orientation description, such as the orientation or position relation indicated by the terms upper, lower, front, rear, left, right, etc., is based on the orientation or position relation shown in the drawings, which is only used for convenience of description of the disclosure and simplification of description instead of indicating or implying that the indicated device or element must have a specific orientation, and be constructed and operated in a specific orientation, and thus shall not be understood as a limitation to the disclosure.

In the description of the disclosure, the meaning of several refers to be one or more, and the meaning of multiple refers to be two or more. The meanings of greater than, less than, more than, etc., are understood as not including the number that follows, while the meanings of above, below, within, etc., are understood as including the number that follows. The terms first and second, if mentioned, it is only for the purpose of distinguishing between technical features, and shall not be understood as indicating or implying relative importance, implicitly indicating the number of the indicated technical features or implicitly indicating the order of the indicated technical features.

In the description of the disclosure, unless otherwise explicitly defined, words such as setting, installing and connecting should be understood in a broad sense, and those having ordinary skills in the art can reasonably determine the specific meanings of the above words in the disclosure in combination with the specific contents of the technical solutions.

In the description of the disclosure, the description with reference to the terms "one embodiment", "some embodiments", "illustrative embodiments", "examples", "specific examples" or "some examples" means that the specific features, structures, materials or characteristics described in connection with this embodiment or example are included in at least one embodiment or example of the disclosure. In the specification, the schematic representation of the above terms does not necessarily mean the same embodiment or example. Moreover, the specific features, structures, materials or characteristics described may be combined in any one or more embodiments or examples in a suitable manner.

As shown in FIG. 1 to FIG. 4, a Christmas LED bulb manufacturing process according to embodiments of the disclosure comprises the sequentially performed following steps of:

S1. taking a conductive wire 110: taking a conductive wire 110 with a preset length, the conductive wire 110 being a Dumet wire a platinum wire;

S2. welding a bracket 112: after taking two conductive wires 110, welding a bracket 112 made of an insulating material between the two conductive wires 110;

S3. removing impurities: removing foreign matters and impurities on a surface of the conductive wire 110;

S4. welding a chip: welding and fixing a LED chip 111 to the conductive wire 110 after impurity removal;

S5. sealing: after the chip is welded, injecting one of silica gel, resin and silica gel, or a mixture of resin and a high thermal conductivity material into the LED chip 111 to form a protection glue 113 wrapping the LED chip 111;

S6. performing secondary machining: straightening and cutting a pin of the sealed conductive wire 110 to regulate the pin of the conductive wire 110;

S7. assembling: inserting the sealed LED chip 111 into a glass tube 100; optionally, the LED chip 111 being capable of emitting light at 180 degrees in the glass tube 100, or the LED chip 111 being capable of emitting light at 360 degrees in the glass tube 100; and S8. performing glass-sealing: melting two ends of the glass tube 100 for sealing and molding.

It should be noted that, the conductive wire 110 after impurity removal is welded and fixed with the LED chip 111, and then, the conductive wire 110 is inserted into the glass tube 100, and glass-sealed with the glass tube 100, so that integral arrangement of the LED chip 111 and the glass tube 100 is realized. Compared with a conventional bulb with a separate wick inserted into a plastic lamp shell, the integrated arrangement of the LED chip 111 and the glass tube 100 can effectively prevent dust and water from entering the LED chip 111, so that the sealing performance of the bulb is better. Therefore, the bulb can withstand worse use environments such as rainy days, and can be applied more widely. Compared with a Christmas tungsten lamp, the finally manufactured Christmas LED bulb is more energy-saving and environment-friendly, and the irradiation effect of light through the glass tube 100 is better.

In some embodiments of the disclosure, the preset length of the conductive wire 110 is 10 mm to 20 mm, and a length of the glass tube 100 is 10 mm to 20 mm. After the conductive wire 110 is inserted into the glass tube 100, 3 mm to 7 mm of the conductive wire 110 is exposed out of the glass tube 100 as a pin, and the pin is used to be energized through a copper wire or other wires to light the LED chip 111. For example, a plurality of Christmas LED bulbs are arranged in a Christmas lamp string along a length direction of the lamp string, and the Christmas LED bulbs enables the corresponding LED chips 111 conductive through the leg and a wire of the lamp string. In some embodiments, secondary machining is performed on the pin of the sealed conductive wire 110 to regulate the pin of the conductive wire 110. The regulated pins of the conductive wires 110 will not stick to each other, which is convenient for subsequent insertion and assembling and glass-sealing.

It should be noted that the most common quality problem in the sealing between the conductive wire 110 and the glass is the appearance of air bubbles at the sealing position, which is the main cause of chronic air leakage. However, the causes of the bubbles are nothing more than dirty surface of the conductive wire 110, damp boron layer, cracks or impurities in a copper layer, and the like. If a vertical black thin line is formed on a sealing surface with bubbles attached, this is because the copper layer is extremely thin and an iron-nickel core wire is exposed out of a sealing pair. In addition, if improper sealing temperature destroys a cuprous oxide layer, chronic air leakage will also occur Therefore, the impurity removal can effectively improve the glass-sealing quality of the conductive wire 110 and the glass tube 100. In some embodiments of the disclosure, physical impurity removal or chemical impurity removal, or both physical impurity removal and chemical impurity removal, can be used in the impurity removal. For example, the conductive wire 110 is cleaned by laser, wherein the common methods of laser cleaning include: laser dry cleaning, that is, direct radiation decontamination by pulse laser; laser+liquid film method, that is, first depositing a layer of liquid film on a surface of a substrate, and then using laser radiation to decontaminate; and laser+inert gas method, that is, while the laser is radiated, inert gas is blown to the surface of the substrate, when the dirt is peeled off from the surface, the dirt will be blown off the surface by the gas immediately, so as to avoid the re-pollution and oxidation of the surface. The laser cleaning technology has incomparable advantages over traditional cleaning methods. Using high-frequency and high-energy laser pulses to irradiate a workpiece surface, the coating can instantly absorb the focused laser energy, so that the oil stain, rust spot or coating on the surface will evaporate or peel off instantly, and surface attachments or coating can be effectively removed at a high speed. Meanwhile, the laser pulses with a short action time will not harm a metal substrate by selecting appropriate parameters. For another example, the conductive wire cleaning solution is used to remove the foreign matters and impurities on the surface of the conductive wire 110.

Figure 2:
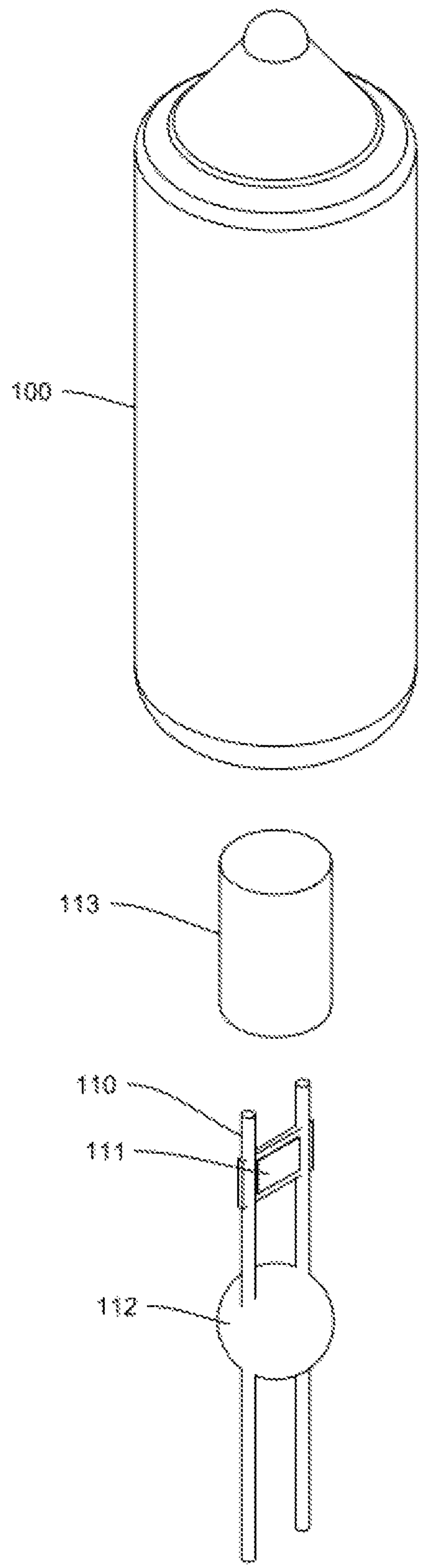
FIG. 2 is an exploded view of a Christmas LED bulb manufactured by the Christmas LED bulb manufacturing process according to the embodiments of the disclosure.
Figure 3:
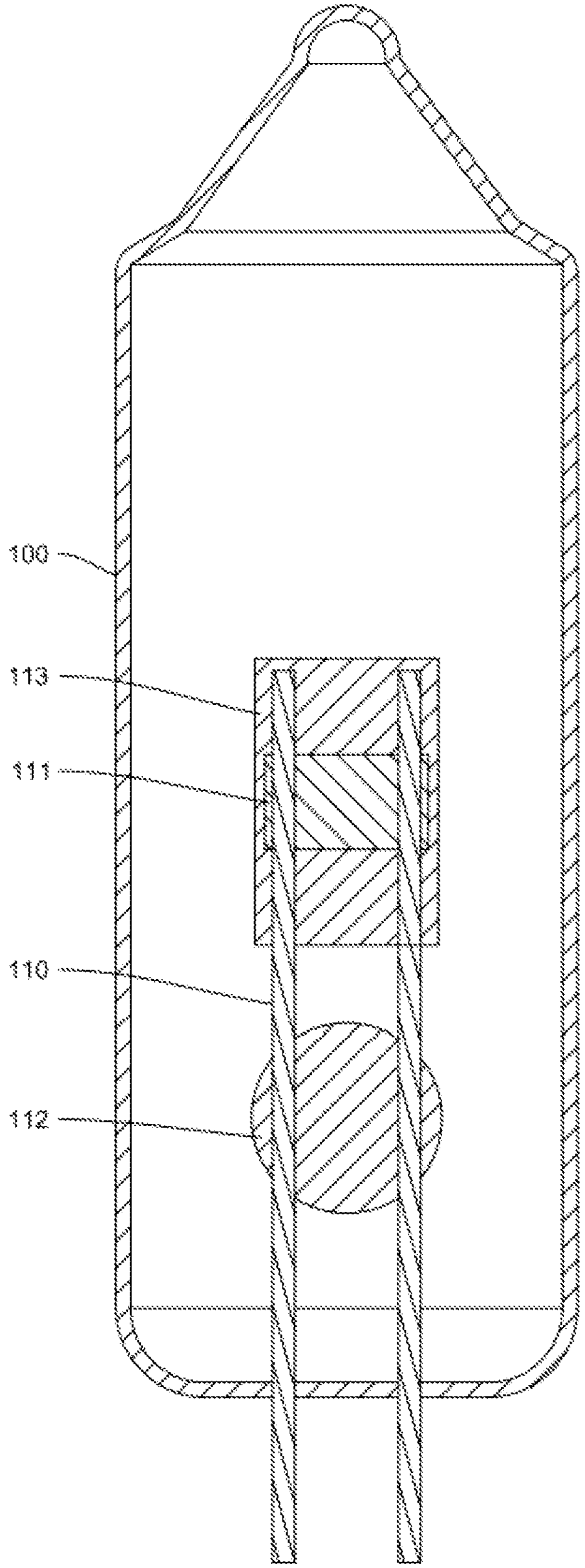
FIG. 3 is a cross-sectional view of the Christmas LED bulb manufactured by the Christmas LED bulb manufacturing process according to the embodiments of the disclosure.
Figure 4:
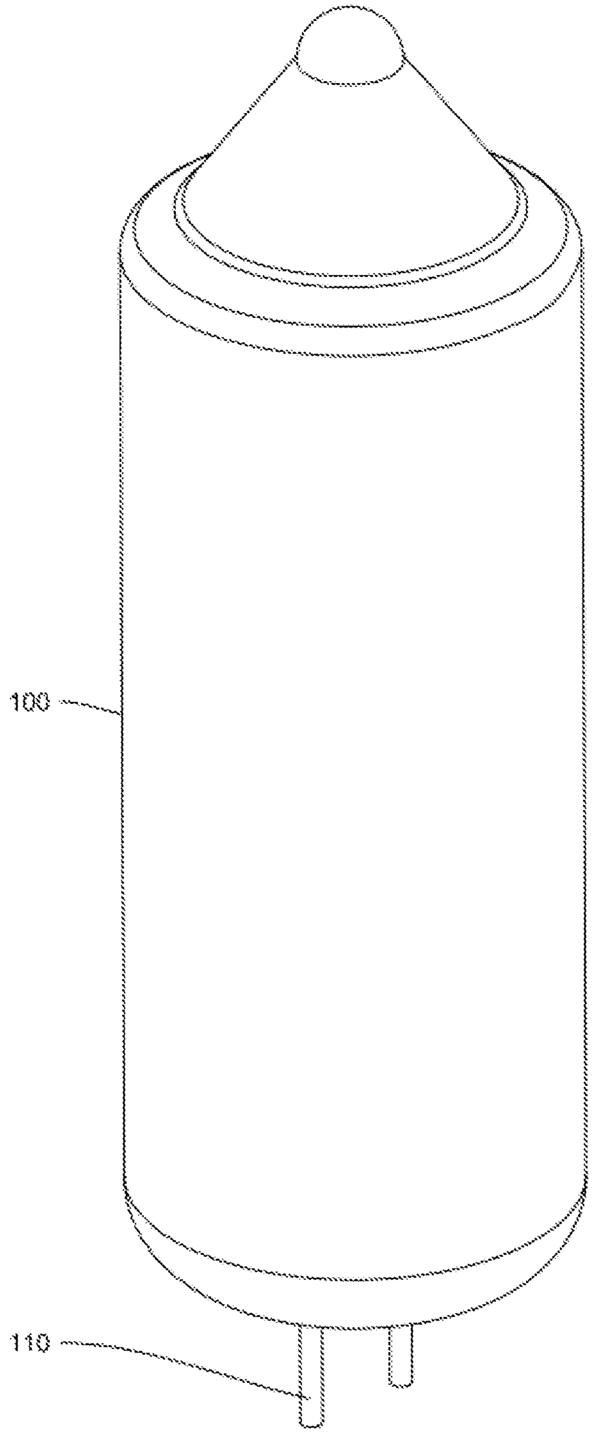
FIG. 4 is a schematic structural diagram showing an overall structure of the Christmas LED bulb manufactured by the Christmas LED bulb manufacturing process according to the embodiments of the disclosure.

In some embodiments of the disclosure, referring to FIG. 2 and FIG. 3, the bracket 112 is made of glass, and the bracket 112 is welded with two conductive wires 110 by means of sintering. The bracket 112 fixes the two conductive wires 110 with respect to each other, which is convenient for fixing the LED chips 111 on the conductive wires 110 and electrically connecting the LED chips with the conductive wires 110. After the two conductive wires 110 are fixed to each other, the conductive wires 110 are more stable when the glass tube 100 is sealed with the conductive wires 110, and a position of the LED chip 111 is more stable after glass-sealing. Further, an outer wall of the bracket 112 abuts against an inner wall of the glass tube 100 (not shown in the figure), and the bracket 112 can locate both positions of the glass tube 100 and the conductive wire 110. Moreover, the bracket is adapted with the glass tube 100 made of glass, and when the glass tube 100 is heated to a melting point of glass for sealing and molding, the bracket 112 will not be burned. In some embodiments, the bracket 112 is of a spherical shape, which is a shape of condensation after melting. In this case, the bracket 112 is directly fused with the conductive wire 110 as the substrate and attached to the conductive wire 110, which is more convenient for processing. Optionally, when the glass tube 100 is of a columnar shape, the bracket 112 abuts against the inner wall of the glass tube 100, and in this case, the bracket 112 plays a guiding role in the insertion of the conductive wire 110.

Specifically, the bracket 112 and the LED chip 111 are inserted into the glass tube 100 together during assembling. Compared with the bracket 112 arranged outside the glass tube 100, a distance between the bracket 112 and the LED chip 111 is closer, which can better stabilize the LED chip 111. Further, referring to FIG. 3 again, the bracket 112 is located at one end of the LED chip 111 facing a spliced position between the LED chip 111 and the glass tube 100. In this case, the bracket 112 can not only position the conductive wire 110, but also block the heat transfer to the LED chip 111 when the glass tube 100 and the conductive wire 110 are glass-sealed, thus reducing the damage of the LED chip 111 due to high temperature and improving the final yield.

It is understood that in an initial state of the glass tube 100, the glass tube 100 is provided with openings at two ends. In some embodiments of the disclosure, referring to FIG. 3, the glass tube 100 is columnar. In the glass-sealing, one end of the LED chip 111 spliced with the glass tube 100 is first fused for sealing and molding, and then the other end of the LED chip 111 spliced with the glass tube 100 is fused for sealing and molding. One end of the LED chip 111 spliced with the glass tube 100 is first fused for sealing and molding, and the conductive wire 110 is fixed to the glass tube 100. Under the action of high temperature, the gas in the glass tube 100 is discharged from the other end. Then, the other end of the LED chip 111 spliced with the glass tube 100 is fused for sealing and molding to form an internal vacuum environment.

The embodiments of the disclosure are described in detail with reference to the drawings above, but the disclosure is not limited to the above embodiments, and various changes may also be made within the knowledge scope of those of ordinary skills in the art without departing from the purpose of the disclosure.

What is claimed is:

1. A Christmas LED bulb manufacturing process, comprising:

taking a conductive wire: taking two conductive wires with a preset length, the conductive wires being Dumet wires or platinum wires;

removing impurities: removing foreign matters and impurities on a surface of the conductive wire;

welding a bracket: welding a bracket made of an insulating material between the two conductive wires, wherein the bracket is made of glass, and the bracket is welded with the two conductive wires by means of sintering;

welding a chip: welding and fixing a LED chip to the conductive wire after impurity removal;

sealing: after the chip is welded, injecting one of silica gel, resin and silica gel, or a mixture of resin and a high thermal conductivity material into the LED chip to wrap the LED chip;

assembling: inserting the sealed LED chip into a glass tube; and performing glass-sealing: melting two ends of the glass tube for sealing and molding, wherein the bracket abuts against an inner wall of the glass tube;

performing machining: straightening and cutting a pin of the sealed conductive wire to regulate the pin of the conductive wire.

2. The Christmas LED bulb manufacturing process of claim 1, wherein during the impurity removal, the conductive wire is cleaned by laser.

3. The Christmas LED bulb manufacturing process of claim 1, wherein during the impurity removal, the conductive wire is immersed in a conductive wire cleaning solution.

4. The Christmas LED bulb manufacturing process of claim 1, wherein the bracket and the LED chip are inserted into the glass tube together during assembling.

5. The Christmas LED bulb manufacturing process of claim 4, wherein the bracket is located at one end of the LED chip facing a spliced position between the LED chip and the glass tube.

6. The Christmas LED bulb manufacturing process of claim 4, wherein the bracket is of a spherical shape.

7. The Christmas LED bulb manufacturing process of claim 1, wherein the glass tube is of a columnar shape, and during the glass-sealing, one end of the LED chip spliced with the glass tube is first fused for sealing and molding, and then the other end of the LED chip spliced with the glass tube is fused for sealing and molding.

* * * * *